United States Patent [19]

Izumi et al.

[11] Patent Number: 4,528,813
[45] Date of Patent: Jul. 16, 1985

[54] CONTROL SYSTEM FOR HYDROSTATIC POWER TRANSMISSION

[75] Inventors: Eiki Izumi; Hiroshi Watanabe; Yukio Aoyagi; Kazuo Honma; Kichio Nakajima, all of Ibaraki, Japan

[73] Assignee: Hitachi Construction Machinery Co., Ltd., Tokyo, Japan

[21] Appl. No.: 290,110

[22] Filed: Aug. 5, 1981

[30] Foreign Application Priority Data

Aug. 6, 1980 [JP] Japan .................................. 55-107144

[51] Int. Cl.³ ............................................. F16H 39/46
[52] U.S. Cl. ...................................... 60/389; 60/444; 60/452; 417/218
[58] Field of Search ................. 60/389, 443, 444, 452, 60/390, 391, 911; 417/218; 364/183

[56] References Cited

U.S. PATENT DOCUMENTS

| 3,744,243 | 7/1973 | Faisandier | 60/452 X |
| 3,898,807 | 8/1975 | Habiger | 60/391 |
| 3,901,031 | 8/1975 | Knapp et al. | 60/444 X |
| 4,189,921 | 2/1980 | Knapp | 60/452 X |
| 4,355,506 | 10/1982 | Leonard | 60/389 |
| 4,369,625 | 1/1983 | Izumi et al. | 60/421 |

Primary Examiner—Irwin C. Cohen
Attorney, Agent, or Firm—Antonelli, Terry & Wands

[57] ABSTRACT

A control system for a hydrostatic power transmission having a variable displacement hydraulic pump (2) and a hydraulic actuator (3) connected in a closed or semi-closed circuit, wherein the displacement of the pump or the delivery thereby is adjustable in accordance with a manipulated variable of an operating lever (13).

9 Claims, 12 Drawing Figures

CONTROL SYSTEM FOR HYDROSTATIC POWER TRANSMISSION

BACKGROUND OF THE INVENTION

This invention relates to hydrostatic power transmissions, and more particularly it is concerned with a control system for a hydrostatic power transmission comprising a variable-displacement hydraulic pump driven by a prime mover and a hydraulic actuator for driving a load which are connected to each other in a closed or semi-closed circuit.

Heretofore a hydrostatic power transmission, comprising a variable-displacement hydraulic pump driven by a prime mover and a hydraulic actuator for driving a load, the pump and actuator being connected to each other in a closed circuit or a semi-closed circuit, has been known in the art of hydraulically operated machines such as bulldozers, hydraulic shovels, hydraulic cranes, etc. The hydraulic pump is provided with means for adjusting the hydraulic pump displacement in accordance with a manipulated variable of manual operating means or an operating lever. A swash-plate pump of the reversible tilt type is used, for example, as a variable-displacement type hydraulic pump.

The means for adjusting the hydraulic pump displacement usually includes a hydraulic pump displacement adjusting mechanism having a hydraulic piston-cylinder unit with a piston rod operatively connected to a swash-plate of the hydraulic pump, and a servo valve connected between the hydraulic pump displacement adjusting mechanism and a hydraulic fluid source, the servo valve being mechanically linked to the operating lever and associated with the hydraulic pump displacement adjusting mechanism to enable the movement of the mechanism to be mechanically fed back to the servo valve.

In a hydrostatic power transmission of the closed circuit type, a hydraulic motor is usually used as a hydraulic actuator, and an auxiliary pump is mounted therein for merely supplying the hydraulic fluid to compensate for leaks of the hydraulic fluid from a main circuit.

In a hydrostatic power transmission of the semi-closed circuit, a hydraulic cylinder is usually used as a hydraulic actuator, wherein, when the hydraulic cylinder is actuated, the difference between the amount of supply of the working fluid and the amount of discharge thereof, which is produced by the difference in volume between the supply side and the discharge side of the cylinder, is discharged through a flushing valve from the main circuit.

In this type of hydrostatic drive system, however, a sudden actuation of the operating lever would cause a sudden increase in the amount of fluid delivered by the hydraulic pump, and a circuit pressure would become inordinately high due to the inertia of the load driven by the hydraulic actuator. This tendency would be marked when the inertia of the load is high. To avoid this phenomenon, crossover relief valves are connected between conduits of the main circuit for releasing the difference between the delivery by the hydraulic pump and the suction by the hydraulic actuator. This relief of the working fluid entails a loss of energy.

To avoid this loss of energy, a proposal has been made to use a circuit pressure control system in "MACHINE DESIGN", pages 114-116, published on Oct. 7, 1976. This system comprises a three-way changeover valve mounted between the pressure fluid inlet of the servo valve connected to the hydraulic pump displacement adjusting mechanism and the pressure fluid source. The servo valve has a spring mounted in one pilot section thereof while allowing the circuit pressure of the electrostatic power transmission to act on the other pilot section, so that when the circuit pressure rises above a value set by the spring at the time of acceleration of the hydraulic actuator, the three-way changeover valve is actuated by the rise of the circuit pressure to reduce the volume of the pressure fluid supplied to the hydraulic pump displacement adjusting mechanism and reduce the rate of increase of the delivery by the hydraulic pump, thereby to avoid an excessively high rise of the circuit pressure above the value set by the spring. Thus the phenomenon of the excess pressure fluid being released from the main circuit through the crossover relief valve to cause a loss of energy can be avoided.

The aforesaid circuit pressure control system of the prior art is able to effect control in such a manner that the delivery by the hydraulic pump is proportional to the manipulated variable of the operation lever but is unable to so control the delivery by the hydraulic pump wile controlling the maximum value of the circuit pressure in accordance with the manipulated variable of the operation lever.

When a machine is manually operated, the need arises not only to control the speed of the machine, but also to control acceleration or force, depending on the circumstances. For example, when a swiveling member of a hydraulic shovel is driven, actuation of the operating lever over a wide range is motivated by two wishes of the operator, one wish representing a desire to abruptly accelerate the swiveling member and the other wish representing a hope that the swiveling member would move at high speed. When a bucket of the hydraulic shovel carries out excavation while being pressed laterally against earth, the operation can be performed more readily if the pressing force is reduced when the operating lever is pulled a short distance and the pressing force is increased when the operating lever is pulled a long distance. Meanwhile, when a negative load (active load) is applied to a hydraulic actuator and the hydraulic actuator performs a pumping function, it is desirable that the circuit pressure be controlled to be kept at a suitably high pressure level at all times irrespective of the manipulated variable of the operation lever, because power recovery efficiency can be improved and the hydraulic rigidity of the hydraulic power transmission is increased to thereby provide improvements in operability of the hydraulic actuator.

Such control has, however, been difficult to effect with the aforesaid circuit pressure control system of the prior art.

SUMMARY OF THE INVENTION

Accordingly, this invention has as its object the provision of a control system for a hydrostatic power transmission capable of greatly improving the operability of a hydraulic machine and recovering power satisfactorily when a negative load is applied.

According to the invention, there is provided a control system for a hydrostatic power transmission including a hydraulic pump of the variable-displacement type driven by a prime mover, a hydraulic actuator for driving a load, the hydraulic pump and the hydraulic actuator being connected together in a closed circuit or a semi-closed circuit, and means for adjusting the displacement of the hydraulic pump or the delivery thereby in accordance with a manipulated variable of manual operating means, the control system comprising: means for sensing the manipulated variable of the manually operated means and generating a signal indicative of the sensed manipulated variable; means for sensing an actual displacement of the hydraulic pump and generating a signal indicative of the sensed actual displacement; means for sensing circuit pressures on the delivery side and suction side respectively of the hydraulic pump and generating signals indicative of the sensed circuit pressures; and control means operative to calculate a hydraulic pump displacement command on the basis of the signal indicative of the sensed manipulated variable and the signals indicative of the circuit pressures, and compare said hydraulic pump displacement command with the signal indicative of the sensed actual displacement to generate a signal for minimizing the difference in the values compared and supply such signal to said displacement adjusting means, said control means including means for calculating said hydraulic pump displacement command in such a manner that when the circuit pressure on the delivery side of the hydraulic pump is higher than that on the suction side thereof, the hydraulic pump displacement is controlled in accordance with the sensed manipulated variable, while the rate of change in the hydraulic pump displacement is controlled in such a manner that a variable cut-off pressure, which may vary depending on the sensed manipulated variable, is established with respect to the circuit pressure on the delivery side, and when the circuit pressure on the suction side of the hydraulic pump is higher than that on the delivery side thereof, the hydraulic pump displacement is controlled in accordance with the sensed manipulated variable, while the rate of change the hydraulic pump displacement is controlled in such a manner that a cut-off pressure which is constant regardless of the manipulated variable is established with respect to the circuit pressure on the suction side.

In said hydraulic pump displacement command calculating means, said constant cut-off pressure may be set at a value which is substantially equal to the maximum value of said variable cut-off pressure.

Preferably, said hydraulic pump displacement command calculating means includes means for deducting from the signal indicative of the circuit pressure on the delivery side of the hydraulic pump the product of said signal indicative of the sensed manipulated variable and a first constant to produce a first amended circuit pressure signal, means for deducting from the signal indicative of the circuit pressure on the suction side of the hydraulic pump the product of said signal indicative of the maximum manipulated variable and a second constant to produce a second amended circuit pressure signal, and function means for determining the increment of the displacement of the hydraulic pump from either one of the first and second circuit pressure signals on the basis of a predetermined functional relation, said function means being operative to establish said variable cut-off pressure when said increment is determined based on the first amended circuit pressure signal and to establish said constant cut-off pressure when said increment is determned based on the second amended circuit pressure signal.

Preferably, said predetermined functional relation is such that when said one of the first and second amended circuit pressure signals is smaller than a predetermined value of the increment of the displacement of the hydraulic pump is constant at maximum and when said one of the first and second amended circuit pressure signals exceeds the predetermined value the increment shows a reduction in value.

In said hydraulic pump displacement command calculating means, the constant cut-off pressure may be set at a value which is smaller than the maximum value of the variable cut-off pressure.

In said hydraulic pump displacement command calculating means, the variable cut-off pressure may be set at a constant value when the absolute value of the sensed manipulated variable signal is smaller than a first predetermined value.

In said hydraulic pump displacement command calculating means, the variable cut-off pressure may be set at a constant maximum value when the absolute value of the sensed manipulated variable signal is greater than a second predetermined value.

In said hydraulic pump displacement command calculating means, the variable cut-off pressure may be set such that when the absolute value of the sensed manipulated variable signal is smaller than a first predetermined value the cut-off pressure shows a constant smaller value, and when the absolute value of the sensed manipulated variable signal is greater than a second predetermined value it shows a constant maximum value, said second predetermined value being larger than said first predetermined value.

In the case where the variable-displacement hydraulic pump is reversible with respect to the delivery direction, said circuit pressure sensing means may include means for sensing a first circuit pressure in one of opposed main conduit means interconnecting the hydraulic pump with the hydraulic actuator in the first circuit and generatng a signal indicative of the sensed first circuit pressure, and means for sensing a second circuit pressure in the other main conduit means and generating a signal indicative of the sensed second circuit pressure, and said hydraulic pump displacement command calculating means may include means for determining which of the first and second circuit pressures is the circuit pressure on the delivery side and which thereof is the circuit pressure on the suction side.

DESCRIPTION OF THE PREFERRED EMBODIMENTS

Preferred embodiments of the invention will now be described in some detail by referring to the accompanying drawings.

Figure 1:
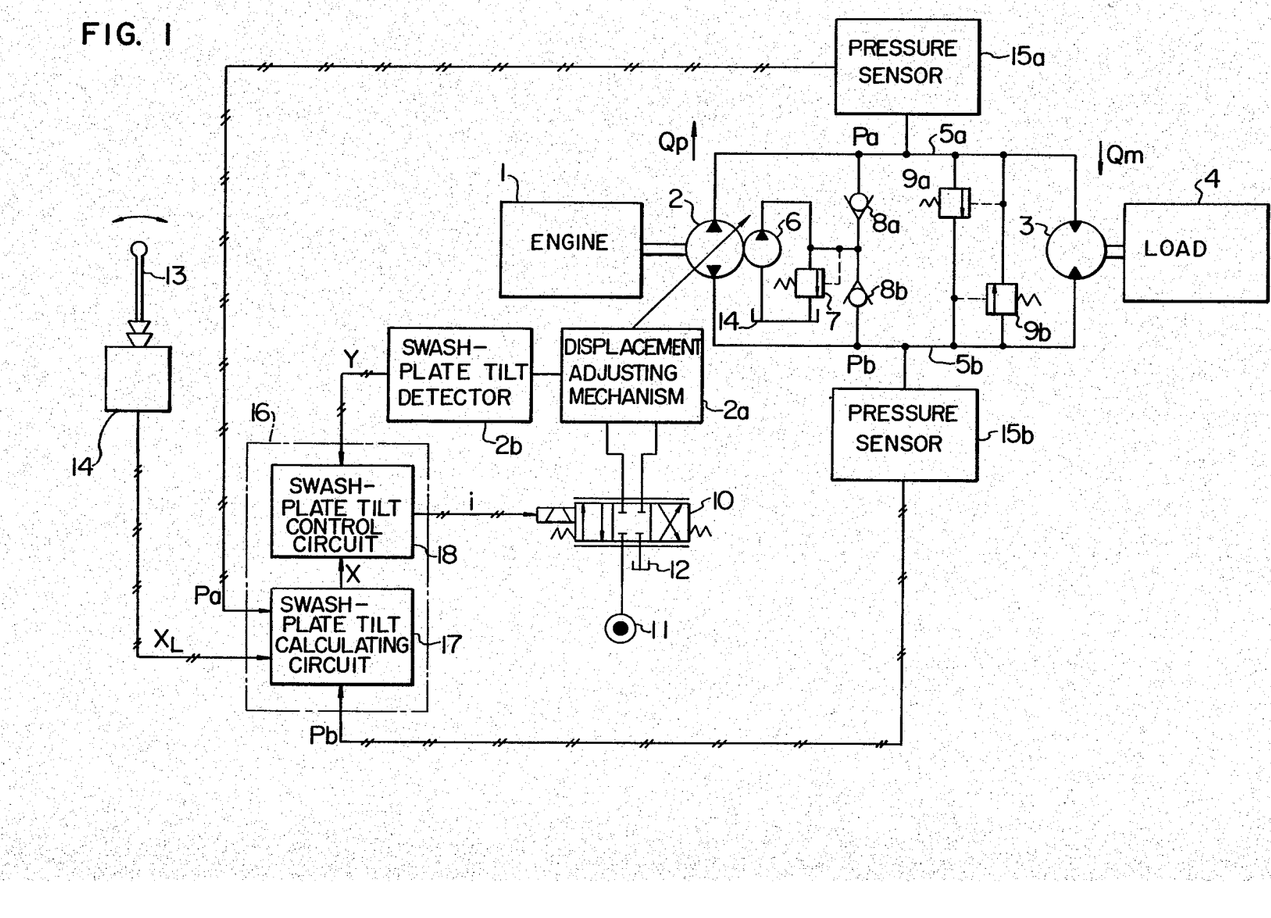
FIG. 1 is a diagram showing a hyrostatic power transmission provided with one embodiment of the control system in conformity with the invention.

FIG. 1 shows a hydrostatic power transmission incorporating therein one embodiment of the control system in conformity with the invention. In the figure, a prime mover 1 which comprises an internal combustion engine, for example, is connected to a variable-displacement hydraulic pump 2 of the reversible tilt type which supplies pressure fluid to a hydraulic motor 3 for rotating same. A load 4 is driven by the hydraulic motor 3, such as an inertial load including a swiveling member of a hydraulic shovel, for example. The hydraulic pump 2 and the hydraulic motor 3 are interconnected at their inlets and outlets by pressure fluid conduits 5a and 5b forming a closed hydraulic circuit. A charge pump 6 is provided to constitute a charge circuit for compensating for leaks which might occur from the main circuit. The charge circuit comprises a low-pressure relief valve 7 for setting the pressure of the circuit. Check valves 8a and 8b are interposed between the charge circuit and the conduits 5a and 5b. Cross-over relief valves 9a and 9b are mounted in conduits interconnecting the conduits 5a and 5b.

The hydraulic pump 2 comprises a swash-plate which is operated by a hydraulic pump displacement adjusting mechanism 2a constituted by a hydraulic piston-cylinder unit, which is connected to a servo valve 10 of the electrohydraulic type. The servo valve 10 controls, in response to an operating current i produced by a control unit 16 and supplied thereto, the flowrate and direction of a pressure fluid supplied from a pressure fluid source 11 to the displacement adjusting mechanism 2a. The numeral 12 designates a reservoir.

A manual operating means or operating lever 13 is provided whose manipulated variable is sensed by a sensor 14, which prepares a signal $X_L$ commensurate with the sensed manipulated variable and supplies same to the control unit 16.

The pressure in the conduit 5a is sensed by a pressure sensor 15a, and the pressure in the conduit 5b is sensed by a pressure sensor 15b. The pressure sensors 15a and 15b prepare circuit pressure signals Pa and Pb commensurate with the respective sensed pressures and supply same to the control device 16. When the hydraulic pump 2 is in positive rotation, the pressure in the conduit 5a represents a circuit pressure on the delivery side of the hydraulic pump 2, and the pressure in the conduit 5b represents a circuit pressure on the suction side.

The displacement of the hydraulic pump 2 or the swash-plate tilt thereof is sensed by a sensor 2b, mounted in the displacement adjustng mechanism 2a, which prepares a signal Y commensurate with the sensed swashplate tilt and supplies same to the control device 16.

The control unit 16 may be in the form of an electronic circuit which receives the manipulated variable signal $X_L$, the circuit pressure signals Pa and Pb and the actual swash-plate tilt signal Y. The control unit 16 comprises a swash-plate tilt calculating circuit 17 and a swash-plate tilt control circuit 18. The swash-plate tilt calculating circuit 17 calculates an optimum swash-plate tilt command and generates a signal X indicative of same on the basis of the lever manipulated variable signal $X_L$ and circuit pressure signals Pa and Pb. The signal X is supplied from the circuit 17 to the swash-plate tilt control circuit 18 where the swash-plate tilt command signal X is compared with the actual swash-plate tilt signal Y and the operating current i, for actuating the pump swash-plate to reduce the difference between the two signals, is supplied to the servo valve 10 of the electrohydraulic type.

The control unit 16 of the control system will be described further in detail. The control unit 16 may be constructed such that, as shown in FIG. 1, the swash-plate tilt calculating circuit 17 and the swash-plate tilt control circuit 18 are formed as different entities. In the embodiment described herein, however, the control unit 16 is a single entity and formed as a microcomputor, whose operation will be described by referring to FIG. 2.

Figure 2:
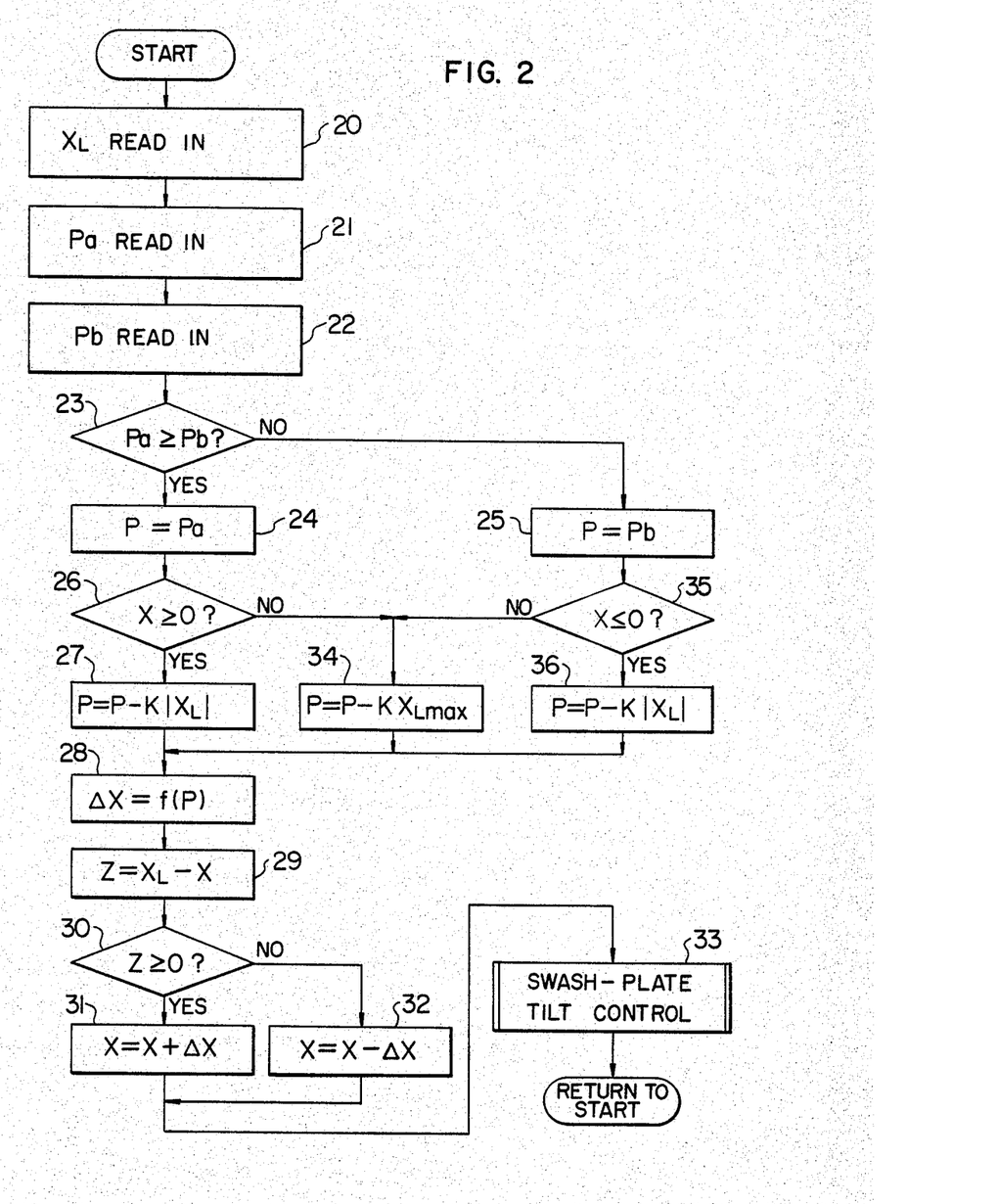
FIG. 2 is a flow chart in explanation of the operation of the control system representing the one embodiment of the invention.

The control process shown in FIG. 2 is performed at a rate of once in a cycle time $\Delta T$.

To start with, in steps 20-22 the lever manipulated variable signal $X_L$ and circuit pressure signals Pa and Pb are read in. Then in step 23, the circuit pressure signals Pa and Pb are compared with each other as to their sides. When $Pa \geq Pb$, the process shifts to step 24; when $Pa < Pb$, the process shifts to step 25.

When $Pa \geq Pb$, the signal Pa is selected in step 24 as the pressure signal P to be used for doing calculations by step 24 which set the value of P as being equal to Pa. Then, in step 26, whether the swash-plate tilt command signal X produced in the preceding cycle was positive (the swash-plate tilting is in the direction in which the conduit 5a is the delivery side of the hydraulic pump 2) or negative (the swash-plate tilting is in the direction in which the conduit 5b is the delivery side of the hydraulic pump 2) is investigated. If the swash-plate tilt command signal X of the preceding cycle was positive, then the hydraulic pump 2 should currently have a positive discharge flowrate Qp. In this case, it is judged that a positive load is being applied to the hydraulic motor 3 (or an inertial load is being accelerated), and the process shifts to step 27.

In step 27, the calculation $P = P - K|X_L|$ is performed based on the lever manipulated variable signal $X_L$ and the pressure signal P. This equation means that the product of the constant K and the absolute value $|X_L|$ of the lever manipulated variable signal is deducted from the value of the pressure signal P determined in step 24 and the value of the pressure signal P is changed to the value determined by this calculation.

Then, in step 28, reference to an increment $\Delta X$ of the swash-plate tilts stored in a memory beforehand is made based on the amended pressure signal P. The function of the increment $\Delta X = f(P)$ of the swash-plate tilt with respect to the amended pressure signal P is in the form shown in FIG. 3. That is, when the amended pressure signal P is smaller than Po, the increment $\Delta X$ of the swash-plate tilt is a maximum value $\Delta Xo$ which is constant; when $P \geq Po$, the increment $\Delta X$ of the swash-plate tilt has the relation $\Delta X = k(P - Pc)$. The minimum value of the increment $\Delta X$ of the swash-plate tilt is limited to $-\Delta Xo$. Po is expressed by $Po = Pc + \Delta X/k$.

As subsequently to be described, the swash-plate tilt command signal X has a time changing rate $dx/dt \approx \Delta X/\Delta T$, so that the increment $\Delta X$ of the swash-plate tilt corresponds to the swash-plate tilting speed. Thus the function referred to hereinabove means that pressure limiting control is effected in such a manner when the value of pressure signal P set in step 27 is smaller than Po, swash-plate tilting speed is kept at a constant maximum value and the amended circuit pressure is quickly raised, and that when $P \geq Po$, the swash-plate tilting speed is reduced along the straight line tilting of $\Delta X = k(P - Pc)$ and the amended circuit pressure is kept at a pressure (cut-off pressure) corresponding to Pc in FIG. 3.

Figure 3:
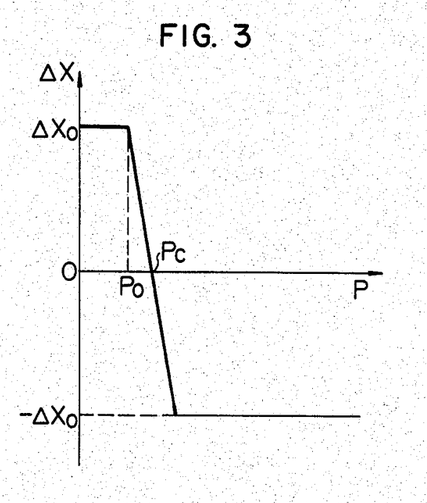
FIG. 3 is a graph showing the relation between the pressure signal P and the increment $\Delta X$ of the swashplate tilting angle X shown in the flow chart in FIG. 2.

On the other hand, since the value of the pressure signal is set in accordance with the equation $P = Pa - K|X_L|$, when Pa is read as an actual pressure signal $P \geq Po$ can be substituted by $Pa - K|X_L| \geq Po$, so that $Pa \geq Po + K|X_L|$. Also, $\Delta x = k[Pc + k|X_L|)]$ is obtained. Consequently the function referred to hereinabove means that when Pa reaches $Po + K|X_L|$, pressure limiting control is initiated, so that a variable cut-off pressure $Pc + K|X_L|$ which varies depending on the manipulated variable is established with respect to the circuit pressure.

When the manipulated variable signal $X_L = 0$ as when the operating lever 13 is restored to a neutral position, for example, pressure limiting control is effected when $Pa \geq Po$ and a cut-off pressure corresponding to Pc is established. Also, when the operating lever 13 is pulled, pressure limiting control is effected when $Pa \geq Po + k|X_L|$ and a cut-off pressure corresponding to $Pc + k|X_L|$ is established. Thus the pressure at which pressure limiting control is initiated becomes higher in proportion to the absolute value $|X_L|$ of the lever manipulated variable signal, and the cut-off pressure also becomes higher.

Then, in step 29, a deviation Z of the lever manipulated variable signal $X_L$ from the swash-plate tilt command signal X produced in the preceding cycle is calculated, and the deviation Z is judged whether it is positive or negative in step 30. When the deviation Z is $Z \geq 0$, the process shifts to step 31.

Figure 4:
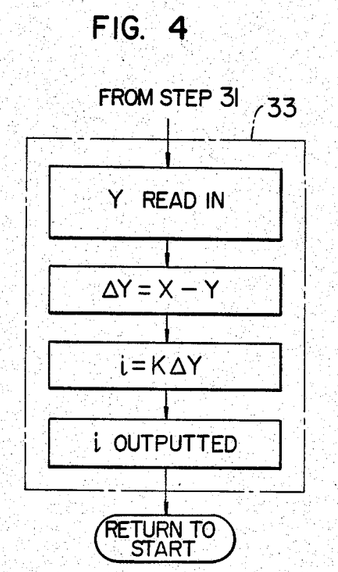
FIG. 4 is a flow chart showing the details of the swash-plate control routine shown in the flow chart of FIG. 2.

In step 31, $\Delta X$ is added to the swash-plate tilt command signal X produced in the preceding cycle, and a fresh swash-plate tilt command signal X is produced and supplied to a swash-plate control routine 33, where the swash-plate tilt command signal X is compared with an actual swash-plate tilt signal Y and an operating signal i for minimizing the difference between them is supplied to the servo valve 10. The details of the swash-plate control routine 33 are shown in FIG. 4.

On the other hand, when the deviation X is $Z < 0$, an increment $\Delta X$ is deducted in step 32 from the swash-plate tilt command signal X produced previously to obtain a fresh swash-plate tilt command signal X which is supplied as an output. It should be noted that if the value of the increment $\Delta X$ of the swash-plate tilt is negative, then the swash-plate tilt command signal X is reduced in value even if addition is made, and the tilt command signal X increases in value even if deduction is made.

It should be noted that the control process is performed at a rate of once in $\Delta T$, so that the time rate of change of the swash-plate tilt command signal X is $dX/dt = \Delta X/\Delta T$. Thus, as the circuit pressure Pa becomes close to the cut-off pressure, the swash-plate tilting speed drops, thereby avoiding an inordinate rise in circuit pressure.

It should also be noted that in steps 29-32, the lever manipulated variable signal $X_L$ and the swash-plate tilt command signal X are compared with each other, and the sign of the increment $\Delta X$ of the swash-plate tilt is switched depending on whether the deviation Z is positive or negative in value. Thus the maximum value of the swash-plate tilt command signal X is limited by the lever manipulated variable signal $X_L$, so that the delivery by the pump can be controlled in accordance with the lever manipulated variable.

When the swash-plate tilt command signal X is $X < 0$ in step 26, the pump delivery flowrate Qp is $Qp \leq 0$ and the circuit pressure Pa is higher than the circuit pressure Pb. Thus it is judged that a negative load is being applied to the hydraulic motor 3 (an inertial load is decelerating, for example) and the process shifts to step 34.

In step 34, the calculation $P = P - KX_{Lmax}$ is performed. $X_{Lmax}$ is a maximum value of the lever manipulated variable $X_L$. That is, even if the lever manipulated variable signal $X_L$ is not maximized at this time, it is regarded as being maximized at a maximum value $X_{Lmax}$ and by disregarding the fact that it is not maximized, thereby to increase the pressure for initiating the pressure limiting control and to increase the cut-off pressure. That is, the cut-off pressure is $Pc + K|X_{Lmax}|$ at all times. Thereafter the process follows the same steps as described hereinabove.

When $Pb > Pa$ with regard to the circuit pressures Pa and Pb in step 23, the process shifts to step 25, and Pb is selected as the pressure signal P for doing calculation, so that $P = Pb$. In step 35, it is judged whether the load applied to the hydraulic motor 3 is positive or negative based on whether the swash-plate tilt command signal X produced in the preceding cycle is positive or negative in value.

When $Pb > Pa$, $X \leq 0$ means that the load is positive and $X > 0$ means that the load is negative. Thus, when the swash-plate tilt command signal X is $X > 0$, the process shifts to step 34, and the pressure for initiating the pressure limiting control is maximized in value regardless of the size of the lever manipulated variable $X_L$. If the swash-plate tilt command signal X is $X \leq 0$, then the load is judged as being positive and the process shifts to step 36.

In step 36, the calculation $P = P - K|X_L|$ is performed. This calculation is done in the same manner as the calculation done in step 27 as aforesaid. That is, when the load is positive, the pressure for initiating the pressure limiting control is rendered proportional to the lever manipulated variable $X_L$.

Figure 5:
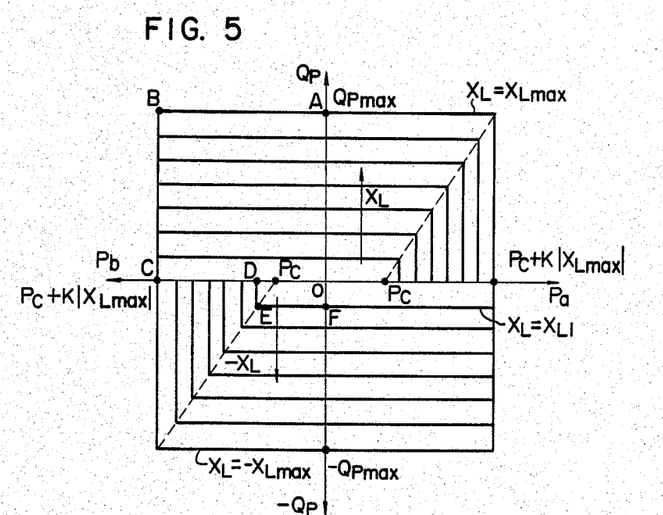
FIG. 5 is a graph showing steadystate control characteristics obtained when the control steps shown in the flow chart of FIG. 2 are followed.

FIG. 5 shows the relation between the circuit pressures Pa and Pb and the delivery flowrate Qp of the hydraulic pump 2 which is obtained when the aforesaid control is effected. It will be seen that when the load is positive (first and third quadrants), not only the delivery flowrate Qp of the hydraulic pump 2 can be controlled in accordance with the manipulated variable $X_L$ of the operating lever 13, but also the maximum value of the circuit pressures Pa and Pb can be controlled in the range between Pc and $Pc + K|X_{Lmax}|$ in accordance with the manipulated variable $X_L$, and that when the load is negative (second and fourth quadrants), it is the delivery flowrate Qp of the hydraulic pump 2 alone that is controlled in accordance with the lever manipulated variable $X_L$ and the maximum value of the circuit pressures Pa and Pb is limited to a constant maximum value, $Pc + K\ X_{Lmax}$, having nothing to do with the lever manipulated variable $X_L$.

FIG. 5 shows the control characteristics obtained in steadystate condition. Let us explain what control process is followed in the event that the lever manipulated variable $X_L$ shows a sudden change. As one example, the case of sudden change of the lever manipulated variable $X_L$ from $X_{Lmax}$ (positive maximum value) to a given negative constant value $-X_{L1}$ with the hydraulic motor 3 driving a pure inertial load will be described.

In this case, the initial condition is such that the delivery flowrate Qp of the hydraulic pump 2 is Qp=Qp$_{max}$ (maximum value) and the circuit pressures Pa and Pb are 0. Thus the initial conditions are indicated at a point A in FIG. 5. When the lever manipulated variable $X_L$ is suddenly changed to $-X_{L1}$ from the initial condition, the increment $\Delta X$ of the swash-plate tilt command signal X is maximized as $\Delta Xo$ in step 28 by the relation shown in FIG. 3, and Z<0 in steps 29 and 30. Thus, in step 32, the swash-plate tilt command signal X is ($X_{Lmax}-\Delta Xo$) and the swash-plate tilt Y shows a sudden reduction. A reduction in the swash-plate tilt Y causes a sudden drop in the delivery flowrate Qp of the hydraulic pump 2, so that the suction side pressure Pb of the hydraulic pump 2 rises and the condition point moves toward a point B. With this movement of the condition point, the process steps shift in the flow chart of FIG. 2 from step 23 to steps 25→35→34→28 and the increment $\Delta X$ of the swash-plate tilt is restricted accordingly. Thus the swash-plate tilt is gradually neutralized while an inordinate rise in circuit pressure is avoided, thereby to decelerate the hydraulic motor 3. That is, the condition point shifts from point B to a point C substantially in a straight line. When the swash-plate tilt command signal X becomes zero and the delivery flowrate Qp of the hydraulic pump 2 becomes 0, the speed of the hydraulic motor 3 becomes 0 substantially at the same time. However, the lever manipulated variable $X_L$ being $-X_{L1}$, still Z<0 in steps 29 and 30 and the calculation on X-$\Delta X$ of the swash-plate tilt command signal X still goes on in step 32, until the value X becomes negative. When X≦0, the process shifts to step 36, so that a cut-off pressure Pc+K$|X_{L1}|$ proportional to the lever manipulated variable $X_L$ is established and the circuit pressure Pb drops. Thus the condition point moves from C to D and E, until finally it reaches a point F where the hydraulic motor 3 attains a steadystate rotation condition.

It should be noted that while the condition point is moving from point B to point C, the kinetic energy of the inertial load 4 is effectively recovered by the prime mover 1 through the hydraulic pump 2.

It will be appreciated that based on the aforesaid way of reasoning in principle, multiplicity of variations on the control pattern can be obtained merely by slightly changing the control program. Some variations on the control pattern will be described by referring to FIGS. 6-12.

Figure 6:
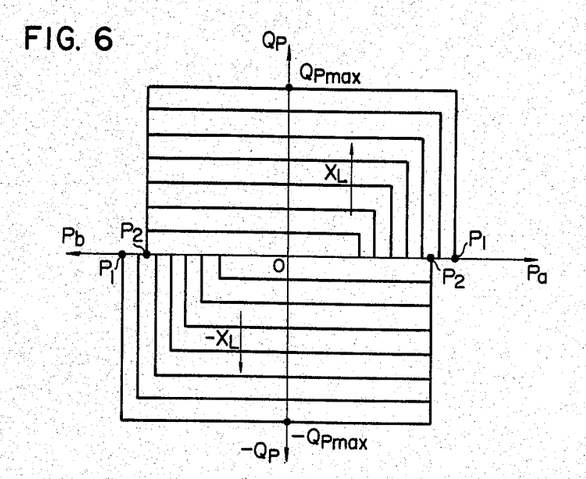
FIGS. 6–9 are graphs showing the control characteristics obtained in other embodiments of the invention.

FIG. 6 shows a variation on the control pattern in which the cut-off pressure (limited control pressure) for a negative load is rendered lower than the maximum cut-off pressure for a positive load. By applying this variation on the control pattern to the hydrostatic power transmission for the swiveling member of a hydraulic shovel, it is possible to cause the maximum acceleration of the swiveling member and the maximum deceleration thereof to balance.

The maximum acceleration $\alpha$ of the hydraulic motor 3 can be expressed by the following equation (1):

$$\alpha = (Dm/J)P_1 - To \quad (1)$$

where Dm is the displacement of the hydraulic motor 3; J is the moment of inertia of the load 4; To is the frictional torque of the hydraulic motor 3 and the load 4; and $P_1$ is the maximum actuation pressure at the time of acceleration.

Meanwhile the maximum deceleration $\beta$ can be expressed by the following equation (2):

$$\beta = (Dm/J)P_2 + To \quad (2)$$

where $P_2$ is the maximum actuation pressure at the time of deceleration.

Thus by setting equations (1) and (2) so that $P_1=P_2$, the relation $\alpha<\beta$ can be obtained and the maximum acceleration is generally rendered higher than the maximum deceleration. To obtain the relation $\alpha=\beta$, one has only to set equations (1) and (2) to obtain the following equation (3);

$$P_2 = P_1 - (2J/Dm)To \quad (3)$$

To realize this variation on the control pattern in actual operation, one has only to use, in step 34 of the flow chart shown in FIG. 2, a suitable constant that would set the value of the control pressure at the pressure $P_2$ shown in equation (3), in place of the K $X_{Lmax}$.

Figure 7:
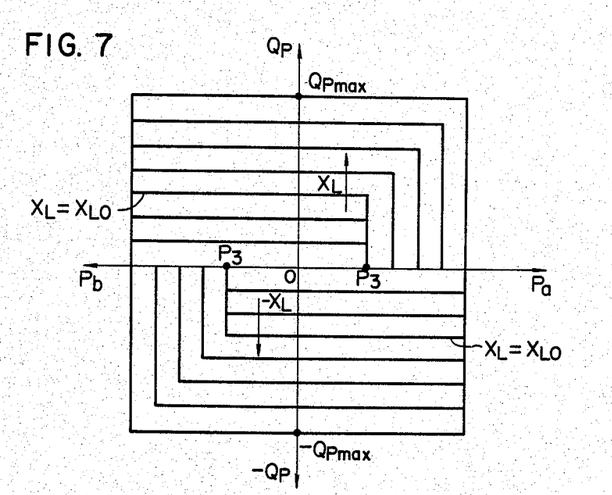

FIG. 7 shows another variation on the control pattern. In this variation, the cut-off pressure for a positive load is set at a constant value $P_3$ having nothing to do with the lever manipulated variable $X_L$, when the lever manipulated variable $X_L$ is small in value and $|X_L|\leq X_{Lo}$. This variation is used when it is desired to give a dead zone to the cut-off pressure in a range of small values of the lever manipulated variable. By using this variation, it is possible to obtain a sufficiently high constant pressure in a range of small values of the lever manipulated variable thereby to enable fine speed control to be effected by the flowrate without being affected by a frictional resistance and other load, except for the pure inertial load. To realize this variation in actual operation, one has only to add to part of the flow chart shown in FIG. 2 the steps 37, 27' and 38 shown in FIG. 10. In the flow chart, $K_1$ is a constant.

Figure 8:
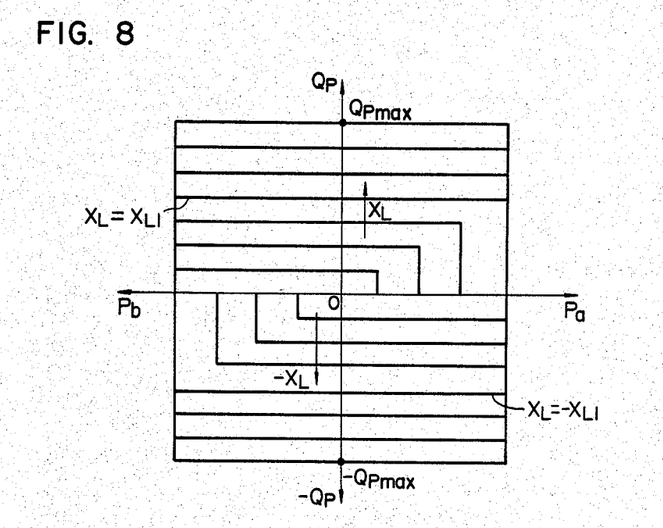

FIG. 8 shows a variation on the control pattern in which, as contrasted to the variation shown in FIG. 7, the cut-off pressure for a positive load is set at a constant maximum value having nothing to do with the lever manipulated variable, when the lever manipulated variable $X_L$ is $|X_L|\geq X_{L1}$. This variation is used when it is desired to give to the cut-off pressure a saturation characteristic in a range of large values of the lever manipulated variable. Thus when the lever manipulated variable rises above a predetermined value, torque can be fully used, thereby permitting fine operability and operation efficiency to be improved. To realize this variation in actual practice, one has only to add to part of the flow chart shown in FIG. 2 the steps 39 and 27" shown in FIG. 11. In the flow chart, $K_2$ is a constant.

Figure 9:
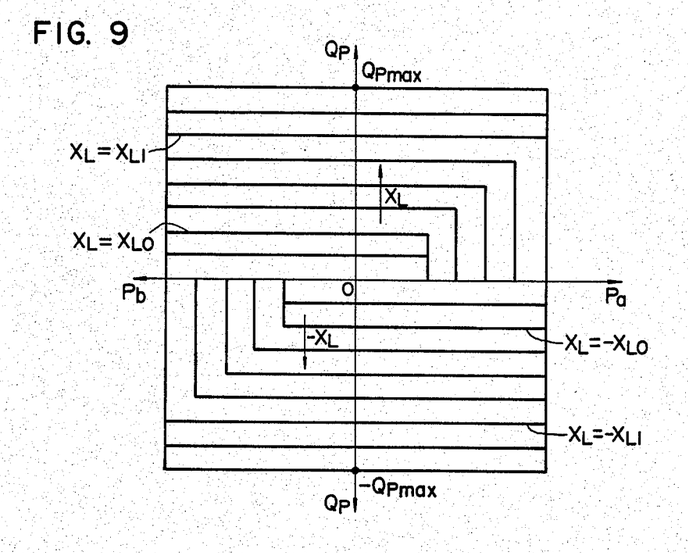
Figure 10:
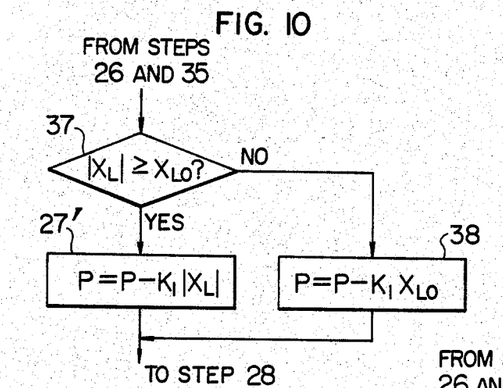
FIGS. 10-12 are fragmentary flow charts showing operations for obtaining the control characteristics shown in FIG. 7-9 respectively.
Figure 11:
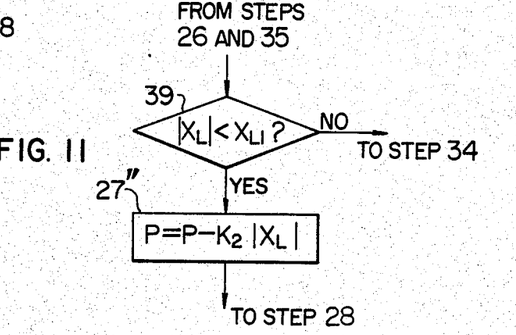
Figure 12:
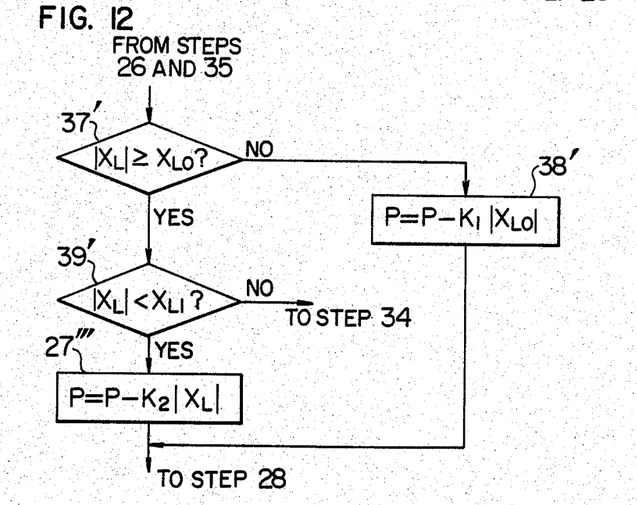

FIG. 9 shows a variation on the control pattern which represents a combination of the variations shown in FIGS. 7 and 8. The variation shown in FIG. 9 is used when it is desired to give to the cut-off pressure for a positive load a dead zone and a saturation characteristic with respect to the lever manipulated variable $X_L$. The variation shown in FIG. 9 combines the advantages of the variations shown in FIGS. 7 and 8. To realize this variation, one has only to add to part of the flow chart shown in FIG. 2 the steps 37', 38', 39' and 27'''.

Other variations on the control pattern make it possible to realize nonlinear characteristics other than the dead zone and saturation, and a combination of any one these variations with the pattern shown in FIG. 6 can be readily made.

From the foregoing description, it will be appreciated that the present invention enables control of the maximum value of the circuit pressures and the delivery flowrate of the hydraulic pump to be both effected by means of an operating lever when a positive load (passive load) is acting on the hydraulic actuator, thereby improving the operability of the hyrostatic power transmission. When a negative load (active load) is applied to the hydraulic actuator, the invention enables power recovery efficiency by the hydraulic pump to be improved by controlling the maximum value of the circuit pressures to a constant value having nothing to do with the operating lever manipulated variable, as well as permits the hydraulic rigidity of the hyrostatic power transmission to be increased and operability to be improved.

What is claimed is:

1. A control system for a hydrostatic power transmission including a hydraulic pump of the variable-displacement type driven by a prime mover, a hydraulic actuator for driving a load, the hydraulic pump and the hydraulic actuator being connected together in a closed circuit or a semi-closed circuit, and means for adjusting the displacement of the hydraulic pump or the delivery thereby in accordance with a manipulated variable of manual operating means, the control system comprising:

means for sensing the manipulated variable of the manually operated means and generating a signal indicative of the sensed manipulated variable;

means for sensing an actual displacement of the hydraulic pump and generating a signal indicative of the sensed actual displacement;

means for sensing circuit pressures on the delivery side and suction side respectively of the hydraulic pump and generating signals indicative of the sensed circuit pressures; and control means operative to calculate a hydraulic pump displacement command on the basis of the signal indicative of the sensed manipulated variable and the signals indicative of the circuit pressures, and compare said hydraulic pump displacement command with the signal indicative of the sensed actual displacement to generate a signal for minimizing the difference in the values compared and supply such signal to said displacement adjusting means, said control means including means for calculating said hydraulic pump displacement command in such a manner that when the circuit pressure on the delivery side of the hydraulic pump is higher than that on the suction side thereof, the hydraulic pump displacement is controlled to change in accordance with the sensed manipulated variable while the rate of change in the hydraulic pump displacement is controlled in such a manner that the displacement of the hydraulic pump is changed at a maximum rate when the circuit pressure on the delivery side is below a predetermined variable cut-off pressure which is set beforehand as a value which increases with increases in the magnitude of the sensed manipulated variable, and the rate of change in the hydraulic pump displacement is reduced when the circuit pressure on the delivery side reaches the predetermined variable cut-off pressure so that the circuit pressure may not exceed the predetermined variable cut-off pressure, and when the circuit pressure on the suction side of the hydraulic pump is higher than that on the delivery side thereof, the hydraulic pump displacement is controlled to change in accordance with the sensed manipulated variable while the rate of change in the hydraulic pump displacement is controlled in such a manner that the displacement of the hydraulic pump is changed at a maximum rate when the circuit pressure on the suction side is below a predetermined cut-off pressure which is set beforehand as a value that is constant regardless of the magnitude of the sensed manipulated variable, and the rate of change in the hydraulic pump displacement is reduced when the circuit pressure on the suction side reaches the predetermined constant cut-off pressure so that the circuit pressure may not exceed the predetermined constant cut-off pressure.

2. A control system as claimed in claim 1, wherein in said hydraulic pump displacement command calculating means, said constant cut-off pressure is set at a value which is substantially equal to the maximum value of said variable cut-off pressure.

3. A control system as claimed in claim 1 or 2, wherein said hydraulic pump displacement command calculating means includes means for producing a circuit pressure value by deducting from the signal indicative of the circuit pressure on the delivery side of the hydraulic pump the product of said signal indicative of the sensed manipulated variable and a first constant , means for producing a circuit pressure value by deducting from the signal indicative of the circuit pressure on the suction side of the hydraulic pump the product of said signal indicative of the maximum manipulated variable and a second constant, and function means for determining an increment of the displacement of the hydraulic pump from either one of the circuit pressure values on the basis of a predetermined functional relation, said function means being operative to establish said variable cut-off pressure when said increment is determined based on the circuit pressure value produced by deducting from the signal indicative of the delivery side circuit pressure and to establish said constant cut-off pressure when said increment is determined based on the circuit pressure value produced by deducting from the signal indicative of the suction side circuit pressure.

4. A control system as claimed in claim 3, wherein said predetermined functional relation is such that when said one of the circuit pressure values is smaller than a predetermined value the increment of the displacement of the hydraulic pump is constant at maximum and when said one of the circuit pressure values exceeds the predetermined value the increment shows a reduction in value.

5. A control system as claimed in claim 1, wherein in said hydraulic pump displacement command calculating means, the constant cut-off pressure is set at a value which is smaller than the maximum value of the variable cut-off pressure.

6. A control system as claimed in claim 1, wherein in said hydraulic pump displacement command calculating means, the variable cut-off pressure is set at a constant value when the absolute value of the sensed manipulated variable signal is smaller than a first predetermined value.

7. A control system as claimed in claim 1, wherein in said hydraulic pump displacement command calculating means, the variable cut-off pressure is set at a constant maximum value when the absolute value of the sensed manipulated variable signal is greater than a second predetermined value.

8. A control system as claimed in claim 1, wherein in said hydraulic pump displacement command calculating means, the variable cut-off pressure is set such that when the absolute value of the sensed manipulated variable signal is smaller than a first predetermined value the cut-off pressure shows a constant smaller value, and when the absolute value of the sensed manipulated variable signal is greater than a second predetermined value it shows a constant maximum value, said second predetermined value being larger than said first predetermined value.

9. A control system as claimed in any one of claims 1, 2, 5, 6, 7, or 8, in which the variable-displacement hydraulic pump is reversible with respect to the delivery direction, wherein said circuit pressure sensing means includes means for sensing a first circuit pressure in one of opposed main conduit means interconnecting the hydraulic pump with the hydraulic actuator in a circuit and generating a signal indicative of the sensed first circuit pressure, and means for sensing a second circuit pressure in the other main conduit means and generating a signal indicative of the sensed second circuit pressure, and said hydraulic pump displacement command means includes means for determining which of the first and second circuit pressures is the circuit pressure on the delivery side and which thereof is the circuit pressure on the suction side.

* * * * *